United States Patent
Mori et al.

(10) Patent No.: US 8,180,477 B2
(45) Date of Patent: May 15, 2012

(54) MACHINING STATUS MONITORING METHOD AND MACHINING STATUS MONITORING APPARATUS

(75) Inventors: Masahiko Mori, Yamatokoriyama (JP); Xiaodong Tian, Davis, CA (US); Bingyan Zhao, Davis, CA (US); Makoto Fujishima, Davis, CA (US); Zhe Jin, Davis, CA (US)

(73) Assignee: Mori Seiki Co., Ltd., Yamato-Koriyama (JP)

( * ) Notice: Subject to any disclaimer, the term of this patent is extended or adjusted under 35 U.S.C. 154(b) by 288 days.

(21) Appl. No.: 12/554,553

(22) Filed: Sep. 4, 2009

(65) Prior Publication Data

US 2010/0063616 A1    Mar. 11, 2010

Related U.S. Application Data

(60) Provisional application No. 61/094,609, filed on Sep. 5, 2008.

(51) Int. Cl.
| | |
|---|---|
| *G06F 19/00* | (2006.01) |
| *G05B 19/04* | (2006.01) |
| *G06K 9/00* | (2006.01) |
| *G06T 17/00* | (2006.01) |

(52) U.S. Cl. ........ 700/160; 700/163; 700/175; 700/192; 700/195; 700/253; 382/154; 345/420

(58) Field of Classification Search .............. 700/97–98, 700/118, 159–160, 163, 175, 186–187, 192–193, 700/195, 253–254; 382/154; 345/419–421
See application file for complete search history.

(56) References Cited

U.S. PATENT DOCUMENTS

| | | | | |
|---|---|---|---|---|
| 4,477,822 A * | 10/1984 | Luoma et al. | ................. | 346/136 |
| 4,871,252 A * | 10/1989 | Beni et al. | ..................... | 356/457 |
| 5,301,284 A * | 4/1994 | Estes et al. | .................... | 711/203 |
| 6,772,038 B2 * | 8/2004 | Kadono | ........................ | 700/159 |
| 6,775,403 B1 * | 8/2004 | Ban et al. | ...................... | 382/154 |
| 7,269,471 B2 * | 9/2007 | Kadono | ........................ | 700/159 |
| 7,496,411 B2 * | 2/2009 | Nakamura | ..................... | 700/11 |
| 7,818,091 B2 * | 10/2010 | Kazi et al. | ..................... | 700/259 |
| 7,852,355 B2 * | 12/2010 | Friedrich et al. | ............. | 345/633 |
| 2001/0000805 A1 * | 5/2001 | Kadono | ........................ | 700/182 |
| 2001/0049846 A1 * | 12/2001 | Guzzi et al. | ...................... | 8/158 |
| 2002/0082742 A1 * | 6/2002 | Kadono | ........................ | 700/160 |

(Continued)

FOREIGN PATENT DOCUMENTS

JP    2005-190102 A    7/2005

*Primary Examiner* — Ramesh Patel

(74) *Attorney, Agent, or Firm* — Westerman, Hattori, Daniels & Adrian, LLP

(57) ABSTRACT

A machining status monitoring apparatus is provided on a machine tool, and has an actual CCD camera for imaging the tool and the workpiece and generating actual two-dimensional image data thereof, a virtual image generating section having a virtual CCD camera corresponding to the actual CCD camera, in which the tool and workpiece of three-dimensional model are imaged by the virtual CCD camera and virtual two-dimensional image data thereof are generated, and a display control section for receiving from a control device of the machine tool, information relating to the coolant supply state and checking whether coolant is being supplied to the contact portion of the tool and the workpiece, and displaying on a display device actual two-dimensional image data when coolant is not being supplied and displaying on the display device virtual two-dimensional image data when coolant is being supplied.

10 Claims, 11 Drawing Sheets

U.S. PATENT DOCUMENTS

| | | | |
|---|---|---|---|
| 2002/0133264 A1* | 9/2002 | Maiteh et al. | 700/182 |
| 2003/0035461 A1* | 2/2003 | Tsikos et al. | 372/108 |
| 2004/0093103 A1* | 5/2004 | Nakamura | 700/96 |
| 2004/0181305 A1* | 9/2004 | Hertinger | 700/178 |
| 2007/0088526 A1* | 4/2007 | Friedrich et al. | 702/150 |
| 2008/0091394 A1* | 4/2008 | Hahn et al. | 703/7 |
| 2009/0015668 A1* | 1/2009 | Tian et al. | 348/92 |
| 2009/0070077 A1* | 3/2009 | Tian et al. | 703/1 |
| 2009/0259444 A1* | 10/2009 | Dolansky et al. | 703/2 |
| 2010/0063615 A1* | 3/2010 | Mori et al. | 700/160 |

\* cited by examiner

Fig. 10
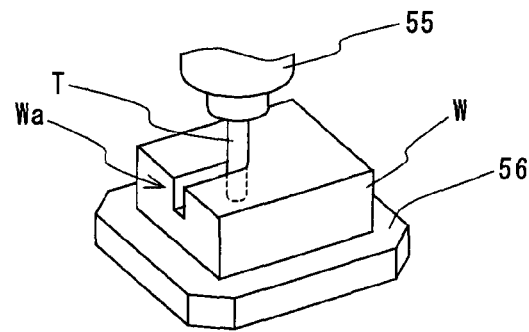
Fig. 11
(a)
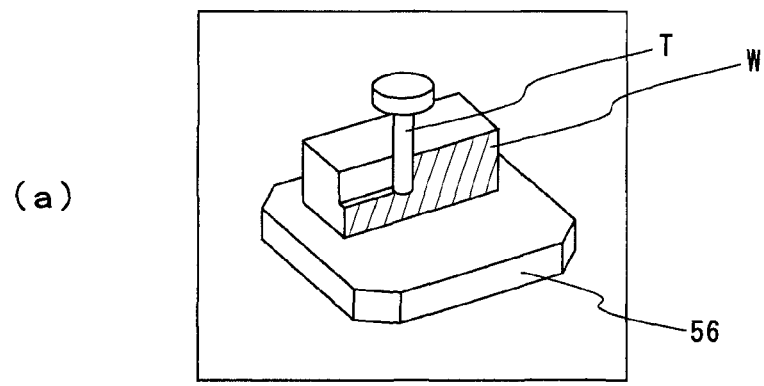
(b)
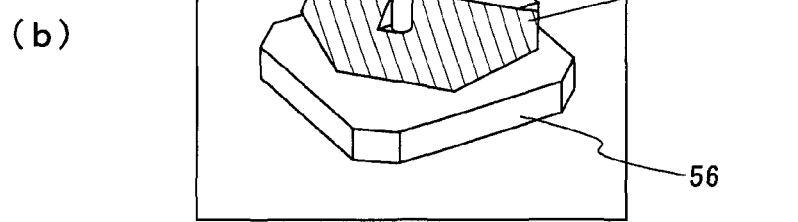

MACHINING STATUS MONITORING METHOD AND MACHINING STATUS MONITORING APPARATUS

TECHNICAL FIELD

The present invention relates to a machining status monitoring method and machining status monitoring apparatus where monitoring images of the machining status of a workpiece in a machine tool are displayed on a display device.

BACKGROUND ART

Many machine tools are configured so that workpieces are machined in an internal area closed by a cover, thereby securing the security. Although the cover has a window, an operator can visually recognize only a limited portion through this window, and therefore, there is a limitation in monitoring the machining status of a workpiece.

Therefore, as described in the Japanese Unexamined Patent Application Publication No. 2005-190102, for example, a camera is arranged in such an internal area in the machine tool and images obtained from this camera are displayed on a display device, thereby the operator can check the machining status of a workpiece with the displayed images.

SUMMARY OF INVENTION

Technical Problem

However, even if a camera is arranged as described above, it is possible that the machining status of a workpiece cannot be monitored sufficiently. That is, during machining of a workpiece, coolant is supplied to a contact portion of the tool and the workpiece depending on the contents of the machining, however, when coolant is being supplied, the operator can check the tool neither through images obtained from the camera nor through the window of the cover due to the supplied coolant. Therefore, the machining status of a workpiece is insufficiently monitored when coolant is being supplied during machining.

The present invention has been achieved in view of the above-described circumstances and an object of the invention is to provide a machining status monitoring method and machining status monitoring apparatus with which it is possible to sufficiently monitor the machining status of a workpiece even while coolant is supplied.

Solution to Problem

The present invention, for achieving the above-described object, relates to a machining status monitoring method in a machine tool having tool holding means for holding a tool, workpiece holding means for holding a workpiece, drive means for operating one or both of the holding means, supply means for supplying coolant to a contact portion of the tool and the workpiece, control means for controlling the operation of the supply means, and controlling the operation of the drive means based on an operation command relating to one or both of the holding means, and display means for displaying image data, the machining status monitoring method comprising:

an actual image generating step of imaging the tool and the workpiece at a certain time interval by means of at least one imaging means from a predetermined view point, and in turn generating actual two-dimensional image data thereof;

a model updating step in which, based on the operation command and data on three-dimensional models of the holding means, tool and workpiece, model data of the holding means, tool and workpiece when one or both of the holding means are operated according to the operation command are generated and the model data thereof are updated;

a virtual image generating step of generating virtual two-dimensional image data of the tool and workpiece based on the model data updated in the model updating step, the virtual image data generating step in which a three-dimensional space is virtually set; in this virtual three-dimensional space, the three-dimensional models of the tool and workpiece are arranged and imaging means having the same condition as that of the actual imaging means is virtually set and arranged; and virtual two-dimensional image data which are assumed to be obtained when the tool and the workpiece are imaged at a certain time interval by the virtual imaging means from the same view point as that of the actual imaging means are generated in turn; and an image display step of checking whether coolant is being supplied to the contact portion of the tool and the workpiece based on information relating to the coolant supply state, and displaying on the display means actual two-dimensional image data generated by the actual imaging means when coolant is not being supplied, and displaying on the display means virtual two-dimensional image data generated in the virtual image generating step when coolant is being supplied.

This machining status monitoring method is appropriately carried out by the following machining status monitoring apparatus.

That is, the machining status monitoring apparatus comprises:

at least one actual imaging means for imaging the tool and the workpiece at a certain time interval from a predetermined view point, and in turn generating actual two-dimensional image data thereof;

model data updating means for, after receiving the operation command from the control means, based on the received operation command and the data on three-dimensional models of the holding means, tool and workpiece, generating model data of the holding means, tool and workpiece which are in a state in which one or both of the holding means are operated according to the operation command, and updating the model data thereof;

virtual image generating means for generating virtual two-dimensional image data of the tool and workpiece based on the model data updated by the model data updating means, the virtual image generating means in which a three-dimensional space is virtually set; in this virtual three-dimensional space, the three-dimensional models of the tool and workpiece are arranged and imaging means having the same condition as that of the actual imaging means is virtually set and arranged; and virtual two-dimensional image data which are assumed to be obtained when the tool and the workpiece are imaged at a certain time interval by the virtual imaging means from the same view point as that of the actual imaging means, are generated in turn; and display control means for, after receiving from the control means the information relating to the state of the supply of coolant by the supply means, checking whether coolant is being supplied to the contact portion of the tool and the workpiece based on the received information, and displaying on the display means actual two-dimensional image data generated by the actual imaging means when coolant is not being supplied, and displaying on the display means virtual two-dimensional image data generated by the virtual image generating means when coolant is being supplied.

According to this machining status monitoring apparatus, when the drive means is controlled by the control means based on an operation command relating to one or both of the tool holding means and workpiece holding means, and thereby one or both of the holding means are operated, the model data of the holding means, tool and workpiece are updated simultaneously with the actual operations of the holding means.

Specifically, based on an operation command from the control means and the model data of the holding means, tool and workpiece, the model data updating means generates model data of the holding means, tool and workpiece which are in a state in which one or both of the holding means are operated according the operation command, and updates the model data thereof.

While the holding means are being operated, the tool and the workpiece are imaged at a certain time interval by at least one actual imaging means from a predetermined view point and actual two-dimensional image data thereof are generated in turn. On the other hand, virtual two-dimensional image data of the tool and workpiece are generated in turn by the virtual image generating means based on the model data updated by the model data updating means. These virtual two-dimensional image data are image data which are assumed to be obtained when the tool and workpiece represented by three-dimensional model, which are arranged in a virtually set three-dimensional space, are imaged at a certain time interval by imaging means having the same condition as that of the actual imaging means (for example, having the same intrinsic parameters), which is virtually set and arranged in the three-dimensional space, from the same view point as that of the actual imaging means.

It is sufficient that the actual two-dimensional images and the virtual two-dimensional images each show at least the tool and the workpiece. And the tool holding means, the workpiece holding means and other machine tool components may be included in the images in addition to the tool and the workpiece.

Thereafter, the display control means displays on the display means either an image in the actual two-dimensional image data generated by the actual imaging means or an image in the virtual two-dimensional image data generated by the virtual image generating means.

During machining of a workpiece, there is a case where coolant is supplied to a contact portion of the tool and the workpiece depending on the contents of the machining. In this case, the operator cannot check the machining status even when actual two-dimensional image data is displayed on a display means.

Therefore, in the present invention, the display control means checks whether coolant is being supplied to the contact portion of the tool and the workpiece based on information relating to the state of the supply of coolant by the supply means which is received from the control means, and displays on the display means the actual two-dimensional image data when coolant is not being supplied, and displays on display means the virtual two-dimensional image data when the coolant is being supplied.

Hence, the operator can visually recognize the machining states of a workpiece through virtual images when coolant is being supplied, and through actual images when coolant is not being supplied, and therefore, the operator can always monitor the machining status of a workpiece regardless of whether coolant is being supplied.

The machining status monitoring apparatus may be configured to have a sectional image generating means for, based on the model data updated by the model data updating means, generating sectional image data including the tool and a sectional shape appearing when at least the workpiece is cut along a plane passing through the distal end of the tool. In this case, the virtual image generating means is configured so that virtual imaging means having the same conditions as those of a plurality of the actual imaging means which image the tool and the workpiece from different view points are set as many as the actual imaging means, and virtual two-dimensional image data which are assumed to be obtained when the tool and workpiece represented by three-dimensional model are imaged at a certain time interval by the virtual imaging means from the same view points as those of the actual imaging means are generated in turn. And in this case, the display control means is configured to check, based on virtual two-dimensional image data generated by the virtual image generating means, whether the distal end of the tool is hidden by the workpiece in all of the virtual two-dimensional images, and display on the display means sectional image data generated by the sectional image generating means when determining that the distal end of the tool is hidden in all of the virtual two-dimensional images.

In the case of hole machining or groove machining, the distal end of the tool is hidden by the workpiece. Therefore, even if actual two-dimensional image data generated by the actual imaging means or virtual two-dimensional image data generated by the virtual image generating means is displayed, the operator cannot monitor the machining status of the workpiece through the displayed images.

Therefore, as described above, when it is configured so that sectional image data is displayed on the display means in the case where the distal end of the tool is hidden in all of virtual two-dimensional images, the operator can check the machining status of the workpiece. The determination whether the distal end of the tool is hidden by the workpiece can be made by referring to depth information in the Z-buffer of the virtual three-dimensional space, for example.

The sectional image generating means may be configured to set a plane which passes through the distal end of the tool and is perpendicular to the optical axis of any one of the actual imaging means as a cutting plane in generating the sectional image data.

When configured in this way, since a sectional image when the tool and the workpiece are viewed from the same direction as that of any one of the actual imaging means can be displayed, it is possible to prevent the operator from having the difficulty of recognizing the direction from which the tool and workpiece are viewed because the direction is changed when a sectional image is displayed. In this sense, it is preferred that the cutting plane is perpendicular to the optical axis of the actual imaging means which generated the actual two-dimensional image data that has been displayed just before sectional image data is displayed (when switching from actual image data to sectional image data).

In the case where the machine tool is a lathe and the workpiece holding means is a spindle, the sectional image generating means may be configured to set a plane passing through the distal end of the tool and the axis of the spindle as a cutting plane in generating the sectional image data.

Effect of the Invention

Thus, according to the machining status monitoring method and machining status monitoring apparatus of the present invention, virtual image data is displayed when coolant is being supplied to a contact portion of a tool and a workpiece. Therefore, the operator can sufficiently monitor the machining status of a workpiece even while coolant is being supplied.

BRIEF DESCRIPTION OF DRAWINGS

FIG. 10 is a perspective view showing the tool and workpiece at the time of groove machining.

FIG. 11 is an illustration showing examples of a sectional image of the embodiment.

DESCRIPTION OF EMBODIMENT

Figure 1:
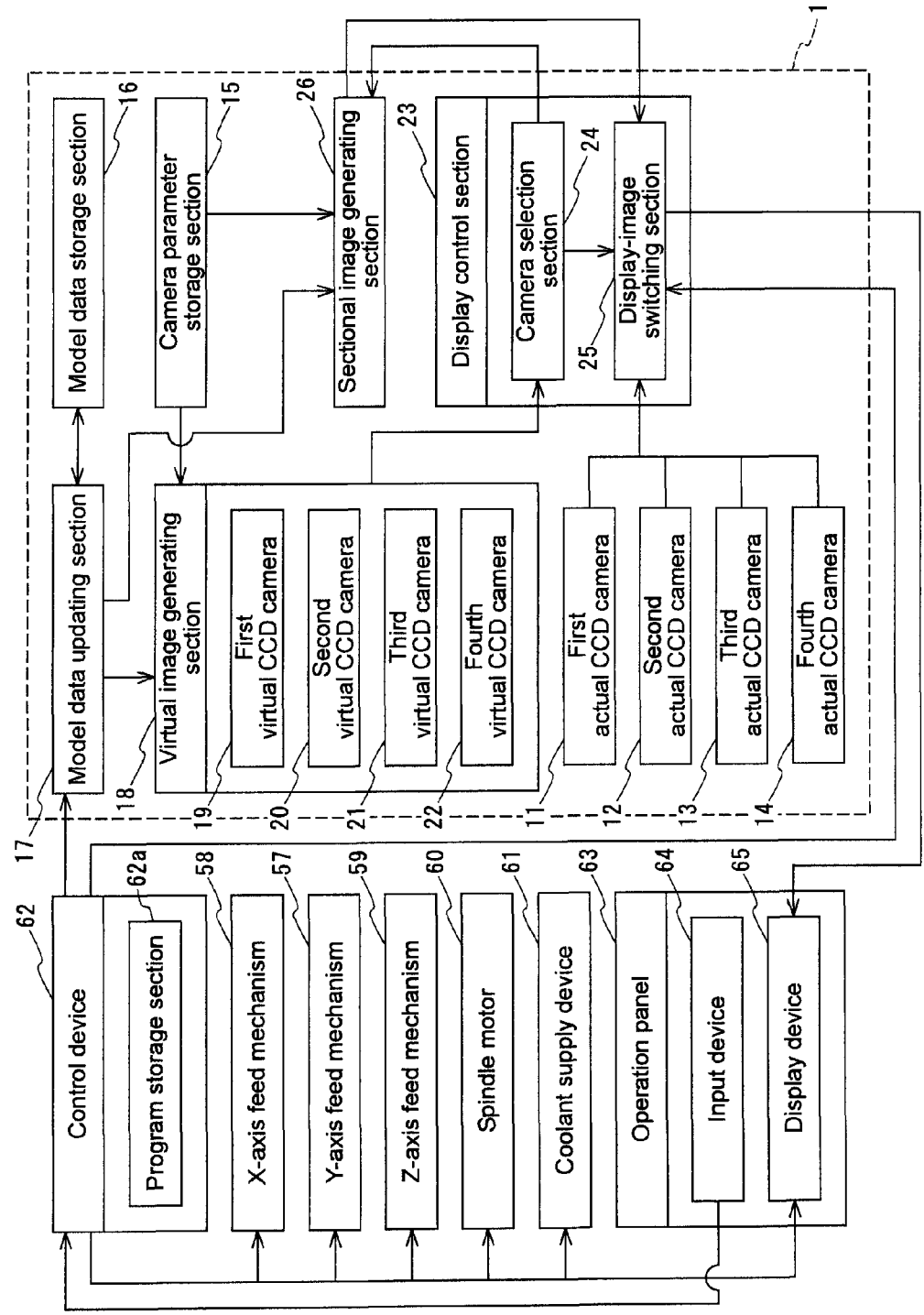
FIG. 1 is a block diagram showing a schematic configuration of a machining status monitoring apparatus and other components according to one embodiment of the present invention.
Figure 2:
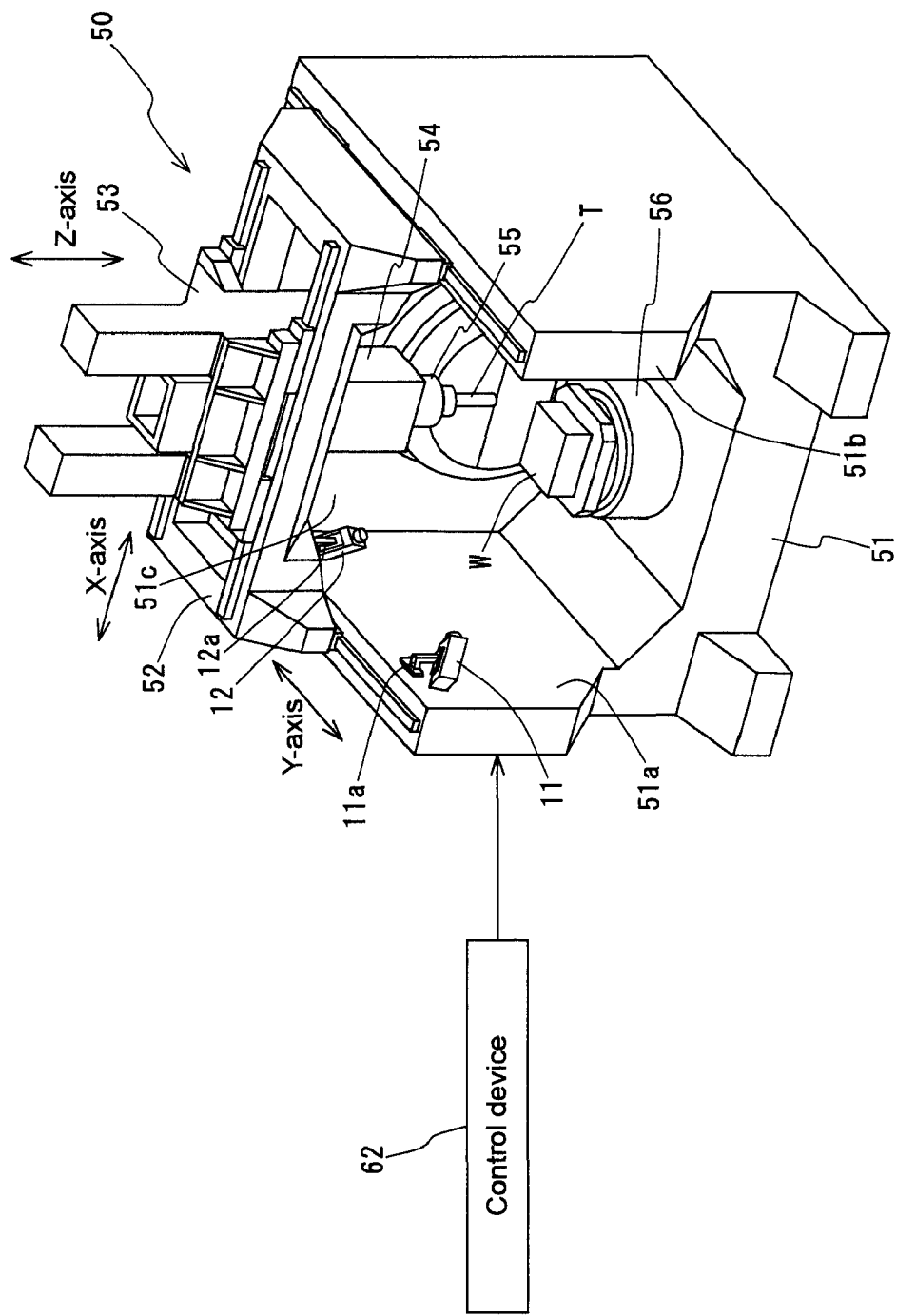
FIG. 2 is a perspective view showing a schematic configuration of a machine tool provided with the machining status monitoring apparatus of the embodiment.
Figure 3:
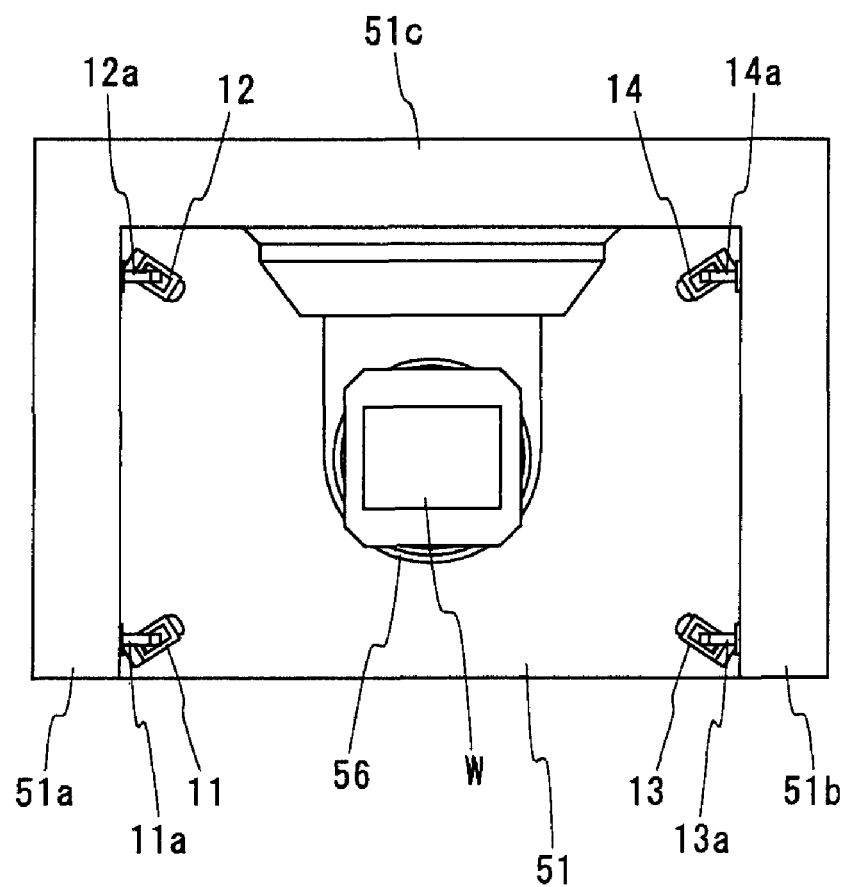
FIG. 3 is a plane view showing an arrangement relationship between a plurality of actual CCD cameras arranged on the machine tool.

Hereinafter, a specific embodiment of the present invention will be described with reference to the accompanying drawings. FIG. 1 is a block diagram showing a schematic configuration of a machining status monitoring apparatus and other components according to one embodiment of the present invention, and FIG. 2 is a perspective view showing a schematic configuration of a machine tool provided with the machining status monitoring apparatus of the embodiment. And FIG. 3 is a plane view showing an arrangement relationship between a plurality of actual CCD cameras arranged on the machine tool.

As shown in FIG. 1, a machining status monitoring apparatus 1 of the present embodiment has a plurality of actual CCD cameras (4 cameras in the present embodiment) 11, 12, 13 and 14, a camera parameter storage section 15, a model data storage section 16, a model data updating section 17, a virtual image generating section 18, a display control section 23, and a sectional image generating section 26, and is provided on a machine tool 50 called a machining center as shown in FIG. 2, for example.

Here, first of all, the machine tool 50 is explained. As shown in FIGS. 1 and 2, the machine tool 50 includes: a bed 51; a first saddle 52 which is disposed on the bed 51 and which can move freely in a horizontal back-and-forth direction (Y-axis direction); a second saddle 53 which is disposed on the first saddle 52 and can move freely in a horizontal side-to-side direction (X-axis direction); a spindle head 54 which is supported by the second saddle 53 and which can move freely in the vertical direction (Z-axis direction); a spindle 55 which is supported by the spindle head 54 so that its axis is parallel to the Z-axis and so as to be rotatable about its axis, and to the lower end portion of which a tool T is mounted; a table 56 which is disposed to the bed 51, and on which a workpiece W is placed; a Y-axis feed mechanism 57, X-axis feed mechanism 58 and Z-axis feed mechanism 59 for respectively moving the first saddle 52, second saddle 53 and spindle head 54 in their respective moving directions; a spindle motor 60 for rotating the spindle 55 about its axis; a coolant supply device 61 for supplying coolant to the contact portion of the tool T and the workpiece W; a control device 62 for controlling the operations of the feed mechanisms 57, 58 and 59, spindle motor 60 and coolant supply device 61; and an operation panel 63 connected to the control device 62.

The bed 51 has a configuration in which side walls 51a, 51b and 51c are provided on the right, left and back sides thereof, respectively. The first saddle 52 is disposed on the upper portions of the right and left side walls 51a and 51b, and the table 56 is disposed to the back side wall 51c. The operation panel 63 is configured with an input device 64 for inputting various signals to the control device 62 and a display device 65 for displaying the control state of the control device 62 and displaying images obtained from the actual CCD cameras 11, 12, 13 and 14, from the virtual image generating section 18, and from the sectional image generating section 26.

The control device 62 includes a program storage section 62a in which a previously generated NC program is stored, and controls the feed mechanisms 57, 58 and 59, the spindle motor 60 and the coolant supply device 61 based on the NC program stored in the program storage section 62a. Specifically, the control device 62 analyzes the NC program block by block, and in turn extracts operation commands relating to the moving positions and feed speed of the first saddle 52, second saddle 53 and spindle head 54, relating to the rotation speed of the spindle 55, and relating to the supply of coolant. Based on the extracted operation commands relating to the moving positions and feed speed of the first saddle 52, second saddle 53 and spindle head 54 and relating to the rotation speed of the spindle 55 and based on feedback signals from the feed mechanisms 57, 58 and 59 and spindle motor 60, the control device 62 controls the feed mechanisms 57, 58 and 59 and the spindle motor 60. Simultaneously, the control device 62 controls the coolant supply device 61 based on the extracted operation commands relating to the supply of coolant.

Further, the control device 62 controls the coolant supply device 61 (the supply and stop of coolant) based on input signals input from the input device 64 by an operator. And it is noted that the control device 62 transmits the extracted operation commands to the model data updating section 17, and transmits the signals relating to the coolant supply state (signal indicating that coolant is being supplied and signal indicating that coolant is not being supplied) to the display control section 23.

Next, the machining status monitoring apparatus 1 is explained. As described above, the machining status monitoring apparatus 1 has the actual CCD cameras 11, 12, 13 and 14 (first actual CCD camera 11, second actual CCD camera 12, third actual CCD camera 13 and fourth actual CCD camera 14), the camera parameter storage section 15, the model data storage section 16, the model data updating section 17, the virtual image generating section 18, the display control section 23 and the sectional image generating section 26. And a computer functions as the camera parameter storage section 15, the model data storage section 16, the model data updating section 17, the virtual image generating section 18, the display control section 23 and the sectional image generating section 26.

As shown in FIGS. 2 and 3, the actual CCD cameras 11, 12, 13 and 14 are arranged to surround the workpiece W on the table 56, and are configured so as to be able to image the workpiece W from four directions. Specifically, the first actual CCD camera 11 and the second actual CCD camera 12 are mounted at the front upper portion and rear upper portion of the left side wall 51a of the bed 51 via brackets 11a and 12a, respectively. The third actual CCD camera 13 and the fourth actual CCD camera 14 are mounted at the front upper portion and rear upper portion of the right side wall 51b of the bed 51 via brackets 13a and 14a, respectively. The actual CCD cameras 11, 12, 13 and 14 each image the tool T mounted to the spindle 55 and the workpiece W on the table 56 at a certain time interval, and in turn generate two-dimensional image data (actual image data) thereof, and output the generated two-dimensional image data to the display control section 23.

Figure 4:
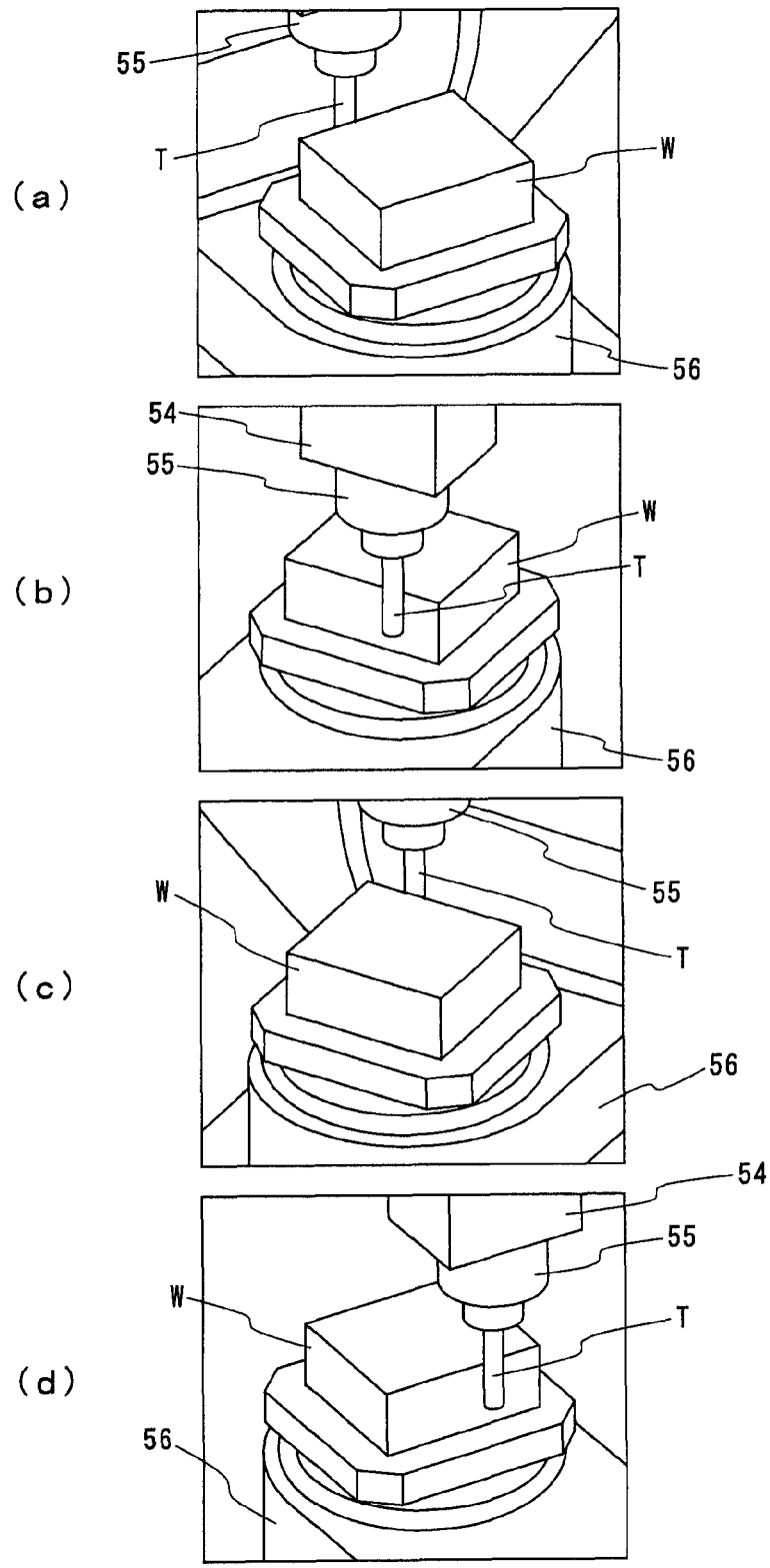
FIG. 4 is an illustration showing examples of an actual image of the embodiment.

Examples of the actual image generated at this time are shown in FIG. 4. FIG. 4(a), FIG. 4(b), FIG. 4(c), and FIG. 4(d) show the actual image data generated by the first actual CCD camera 11, the actual image data generated by the second actual CCD camera 12, the actual image data generated by the third actual CCD camera 13, and the actual image data generated by the fourth actual CCD camera 14, respectively. In these actual images, a part of the bed 51, a part of the spindle head 54, a part of the spindle 55 and a part of the table 56 are also included in addition to the tool T and the workpiece W.

In the camera parameter storage section 15, intrinsic and extrinsic parameters of the actual CCD cameras 11, 12, 13 and 14 are stored. The intrinsic parameters are characteristic parameters of each of the actual CCD cameras 11, 12, 13 and 14, and include, for example, a principal point coordinate, a scale factor, skewness of the two image axes and the like. The extrinsic parameters represent the positions and orientations of each of the actual CCD cameras 11, 12, 13 and 14 in the coordinate system of the machine tool 50. These parameters are previously calculated by a calibration process.

In the model data storage section 16, for example, previously generated data on a three-dimensional model (model data) of the entire machine tool 50 is stored. The model data of the entire machine tool 50 includes model data of the main components of the machine tool 50 such as the bed 51, the first saddle 52, the second saddle 53, the spindle head 54, the spindle 55 and the table 56, model data of the tool T mounted to the spindle 55, and model data of the workpiece W fixed on the table 56. And the model data of the components, tool T and workpiece W are related to one another.

Figure 5:
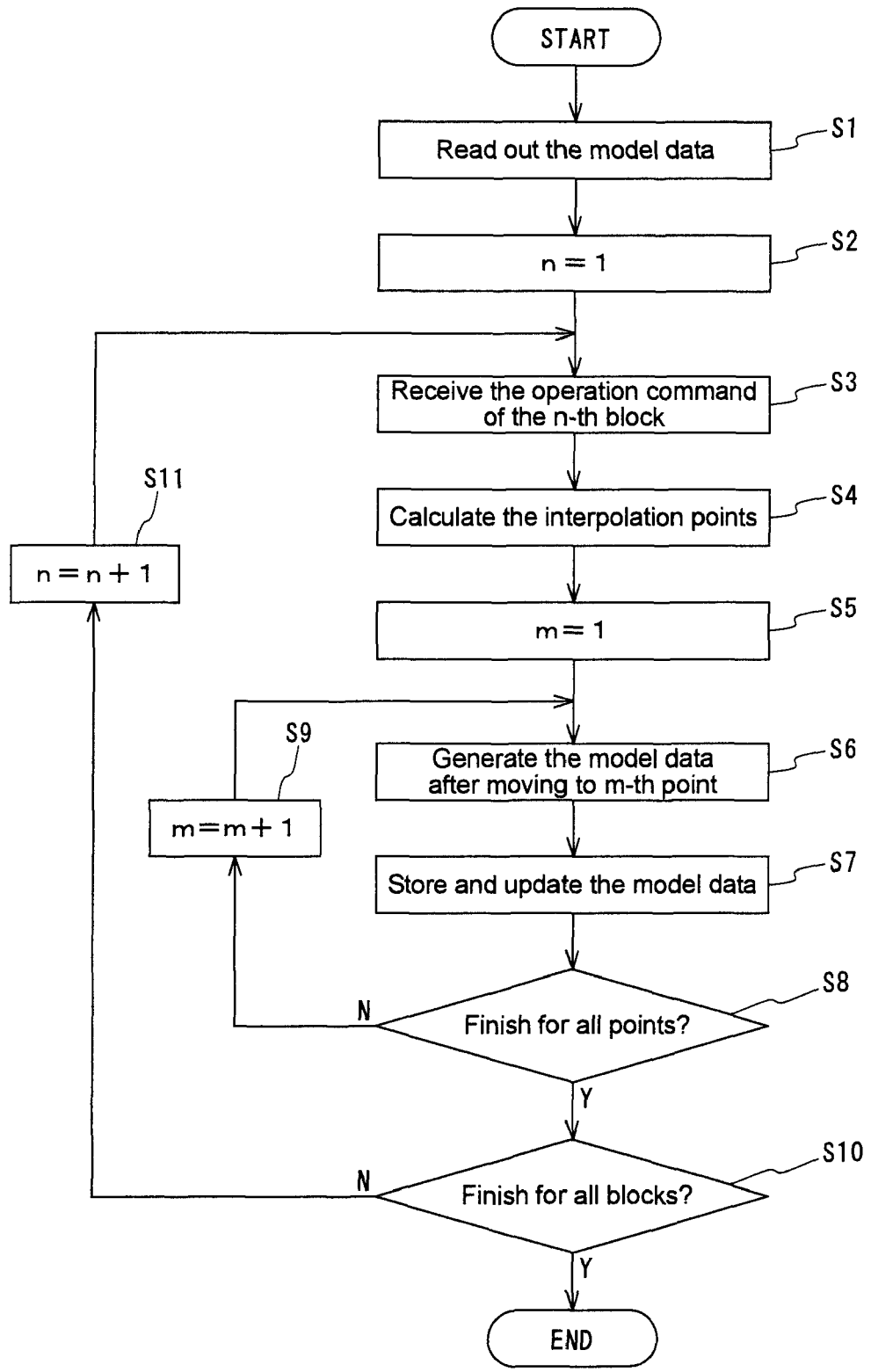
FIG. 5 is a flowchart showing a series of processes in a model data updating section of the embodiment.

The model data updating section 17 updates the model data of the entire machine tool 50 stored in the model data storage section 16 by carrying out a series of processes as shown in FIG. 5. This updating process is carried out synchronously with the actual operations of the first saddle 52, second saddle 53 and spindle head 54.

As shown in FIG. 5, first, the model data updating section 17 reads out the model data of the entire machine tool 50 stored in the model data storage section 16 (step S1), sets a counter n at 1 (step S2), and receives an operation command in the first block of a machining program from the control device 62 (step. S3).

Next, the model data updating section 17 recognizes the operation command which was received in step S3, and calculates interpolation points (step S4). For example, when the recognized operation command is a command to move the first saddle 52, the second saddle 53 and the spindle head 54, the model data updating section 17 sets a plurality of interpolation points on their respective moving paths between their respective movement start points and movement end points, and calculates the position of each interpolation point. By such interpolation, as described later, model data of the first saddle 52, second saddle 53 and spindle head 54 which gradually move from their respective movement start points toward their respective movement end points are generated.

Thereafter, the model data updating section 17 sets a counter m at 1 (step S5), and generates model data of the first saddle 52, second saddle 53 and spindle head 54 which are moved to the first point on their respective moving paths (step S6). At this time, if the model data of the tool T and the model data of the workpiece W partially overlap each other, the model data updating section 17 calculates the overlap area (cutting area), and generates the model data of the workpiece W so that this cutting area is removed therefrom. Thereafter, in step S7, the generated model data are stored in the model data storage section 16 and the model data therein are updated.

And, while updating the counter m, the processes of steps S6 and S7 are repeated until model data of the first saddle 52, second saddle 53 and spindle head 54 which are moved to the last point on their respective moving paths (that is, the moving positions according to the movement command) are generated and the model data in the model data storage section 16 are updated (steps S8 and S9).

Further, while updating the counter n, the processes of steps S3 to S9 are also carried out to all blocks in the machining program (steps S10 and S11). Thereafter, the series of processes are terminated.

The virtual image generating section 18 generates two-dimensional image data (virtual image data) of, for example, the tool T, workpiece W and a part of the table 56 by a computer process based on the parameters stored in the camera parameter storage section 15 and the model data updated by the model data updating section 17.

Figure 6:
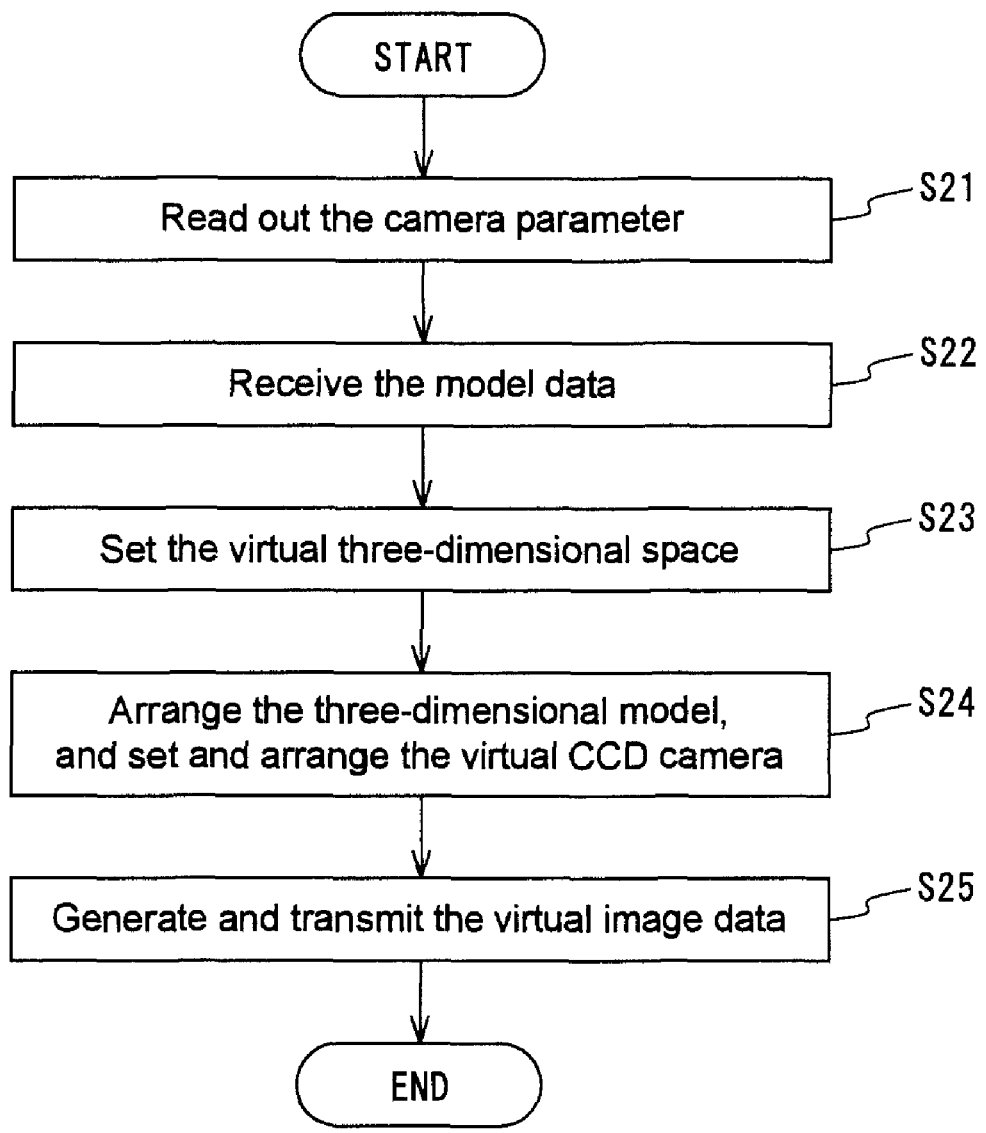
FIG. 6 is a flowchart showing a series of processes in a virtual image generating section of the embodiment.

Specifically, the virtual image generating section 18 is configured to carry out a series of processes such as shown in FIG. 6. First, the virtual image generating section 18 reads out the parameters stored in the camera parameter storage section 15 (step S21), and then receives the model data updated by the model data updating section 17 (step S22).

Next, a three-dimensional space having the same coordinate system as the coordinate system of the machine tool 50 is virtually set (step S23). And, based on the read parameters and the received model data (the model data of the tool T, workpiece W and a part of the table 56 among the model data of the entire machine tool 50), in the set virtual three-dimensional space, three-dimensional models of the tool T, workpiece W and a part of the table 56 are arranged and virtual CCD cameras 19, 20, 21 and 22 (first virtual CCD camera 19, second virtual CCD camera 20, third virtual CCD camera 21 and fourth virtual CCD camera 22) are set and arranged as many as the actual CCD cameras 11, 12, 13 and 14 (step S24).

The first virtual CCD camera 19 corresponds to the first actual CCD camera 11; the second virtual CCD camera 20 corresponds to the second actual CCD camera 12; the third virtual CCD camera 21 corresponds to the third actual CCD camera 13; and the fourth virtual CCD camera 22 corresponds to the fourth actual CCD camera 14. Since the virtual CCD cameras 19, 20, 21 and 22 are respectively arranged at the same positions and in the same orientations as the actual CCD cameras 11, 12, 13 and 14 based on the read extrinsic parameters, the view points of the virtual CCD cameras 19, 20, 21 and 22 match the view points of the actual CCD cameras 11, 12, 13 and 14, respectively. Since the intrinsic parameters of the virtual CCD cameras 19, 20, 21 and 22 are respectively set to be the same as the intrinsic parameters of the actual CCD cameras 11, 12, 13 and 14 based on the read intrinsic parameters, the conditions of the virtual CCD cameras 19, 20, 21 and 22 match the conditions of the actual CCD cameras 11, 12, 13 and 14, respectively.

Thereafter, the virtual image generating section 18 in turn generates two-dimensional image data which is assumed to be obtained when the tool T, workpiece W and a part of the table 56 which are represented by three-dimensional model are imaged at a certain time interval by the virtual CCD cameras 19, 20, 21 and 22, and transmits the generated two-dimensional image data to the display control section 23 (step S25).

Figure 7:
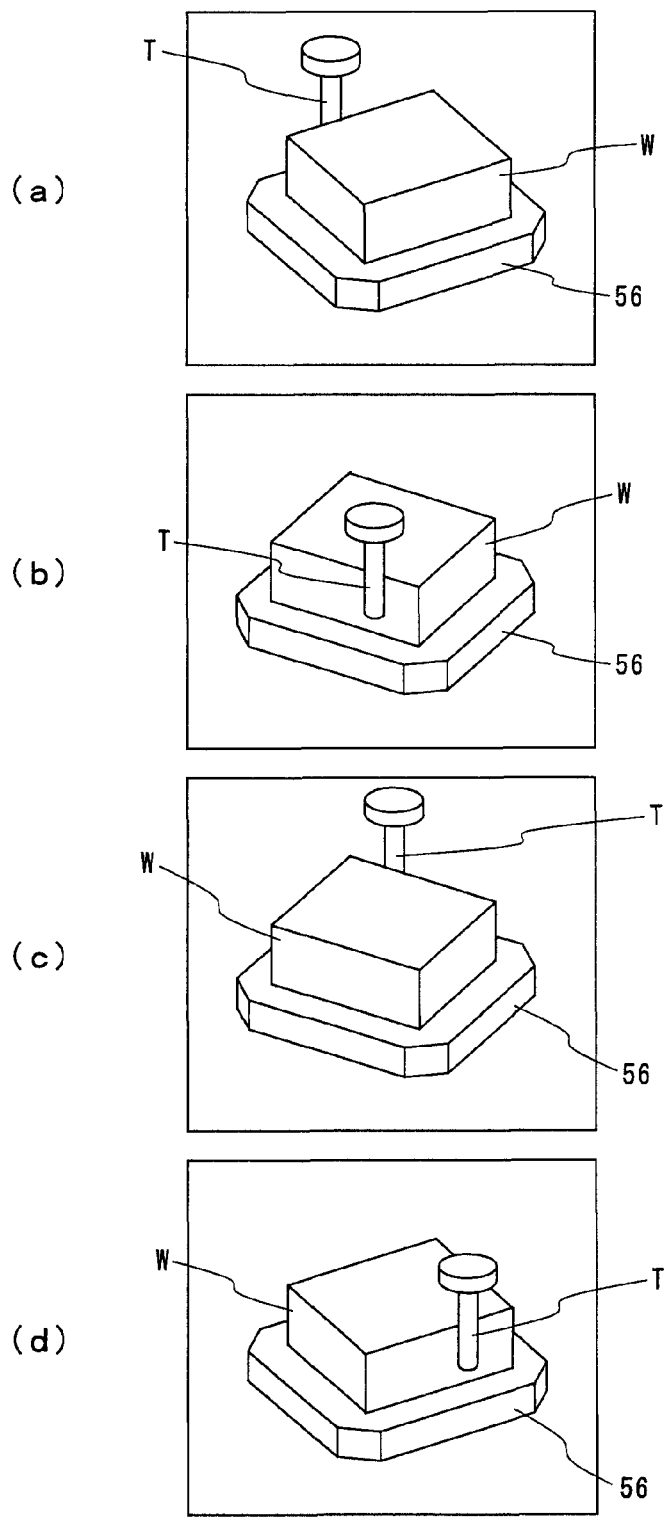
FIG. 7 is an illustration showing examples of a virtual image of the embodiment.

Examples of the virtual image generated at this time are shown in FIG. 7. FIG. 7(a), FIG. 7(b), FIG. 7(c), and FIG. 7(d) show the virtual image data generated by the first virtual CCD camera 19, the virtual image data generated by the second virtual CCD camera 20, the virtual image data generated by the third virtual CCD camera 21, and the virtual image data generated by the fourth virtual CCD camera 22, respectively.

The display control section 23 is configured with a camera selection section 24 and a display-image switching section 25. The camera selection section 24 selects one actual CCD camera and one virtual CCD camera which are each able to capturing an image in which the distal end of the tool T is not hidden by the workpiece W, from the actual CCD cameras 11, 12, 13 and 14, and from the virtual CCD cameras 19, 20, 21 and 22, respectively, based on the virtual image data transmitted from the virtual image generating section 18.

Figure 8:
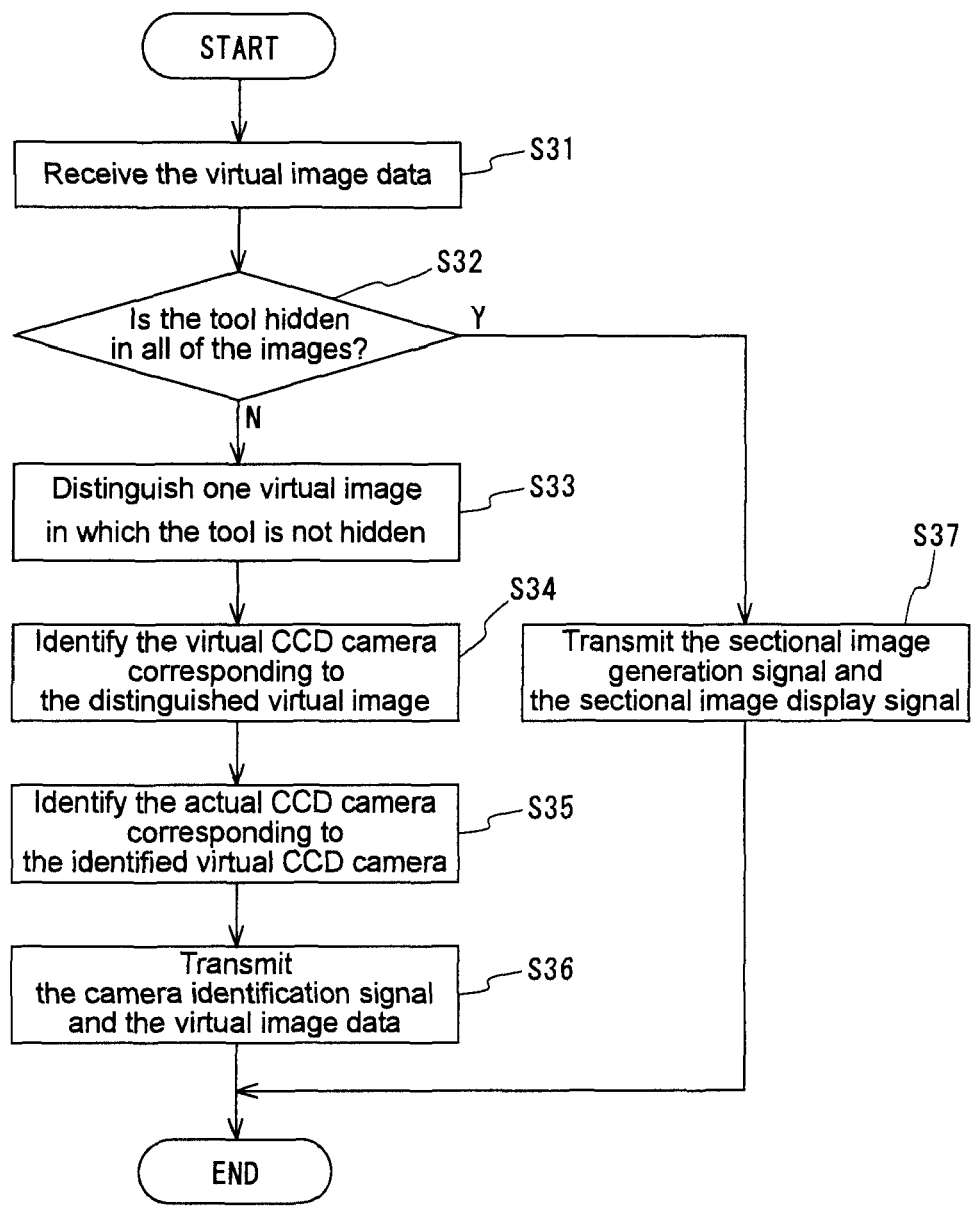
FIG. 8 is a flowchart showing a series of processes in a camera selection section of the embodiment.

Specifically, the camera selection section 24 is configured to carry out a series of processes as shown in FIG. 8. First, the camera selection section 24 receives the virtual image data transmitted from the virtual image generating section 18 (step S31), and then checks whether the distal end of the tool T is hidden by the workpiece W in all of the virtual images, based on the received virtual image data (step S32). It is noted that the determination whether the distal end of the tool T is hidden by the workpiece W can be made by referring to depth information in the Z-buffer of the virtual three-dimensional space, for example.

When determining that the distal end of the tool T is not hidden, the camera selection section 24 distinguishes the virtual image in which the distal end of the tool T is not hidden (step S33). When there is a plurality of the virtual images in which the distal end of the tool T is not hidden, any one of such virtual images is selected, for example, at random and distinguished. For example, in the case of the virtual images shown in FIG. 7, the image shown in FIG. 7(b) or 7(d) is distinguished.

Thereafter, the camera selection section 24 identifies the virtual CCD camera corresponding to the distinguished virtual image (step S34), and identifies the actual CCD camera corresponding to the identified virtual CCD camera (step S35). Next, the camera selection section 24 transmits a camera identification signal for distinguishing the identified actual CCD camera and the virtual image data distinguished in step S33 to the display-image switching section 25 (step S36).

On the other hand, in step S32, when determining that the distal end of the tool T is hidden in all of the virtual images, the camera selection section 24 transmits a sectional image generation signal to the sectional image generating section 26, and simultaneously transmits a sectional image display signal to the display-image switching section 25 (step S37). As an example of the case to which this is applied, the case where a groove Wa is formed on the workpiece W by machining as shown in FIG. 10 is provided.

The display-image switching section 25 displays on the display device 65 the actual image data output from any one of the actual CCD cameras 11, 12, 13 and 14, the virtual image data transmitted from the camera selection section 24, or the sectional image data transmitted from the sectional image generating section 26, and switches the image to be displayed on the display device 65 between the actual image data, the virtual image data and the sectional image data.

Figure 9:
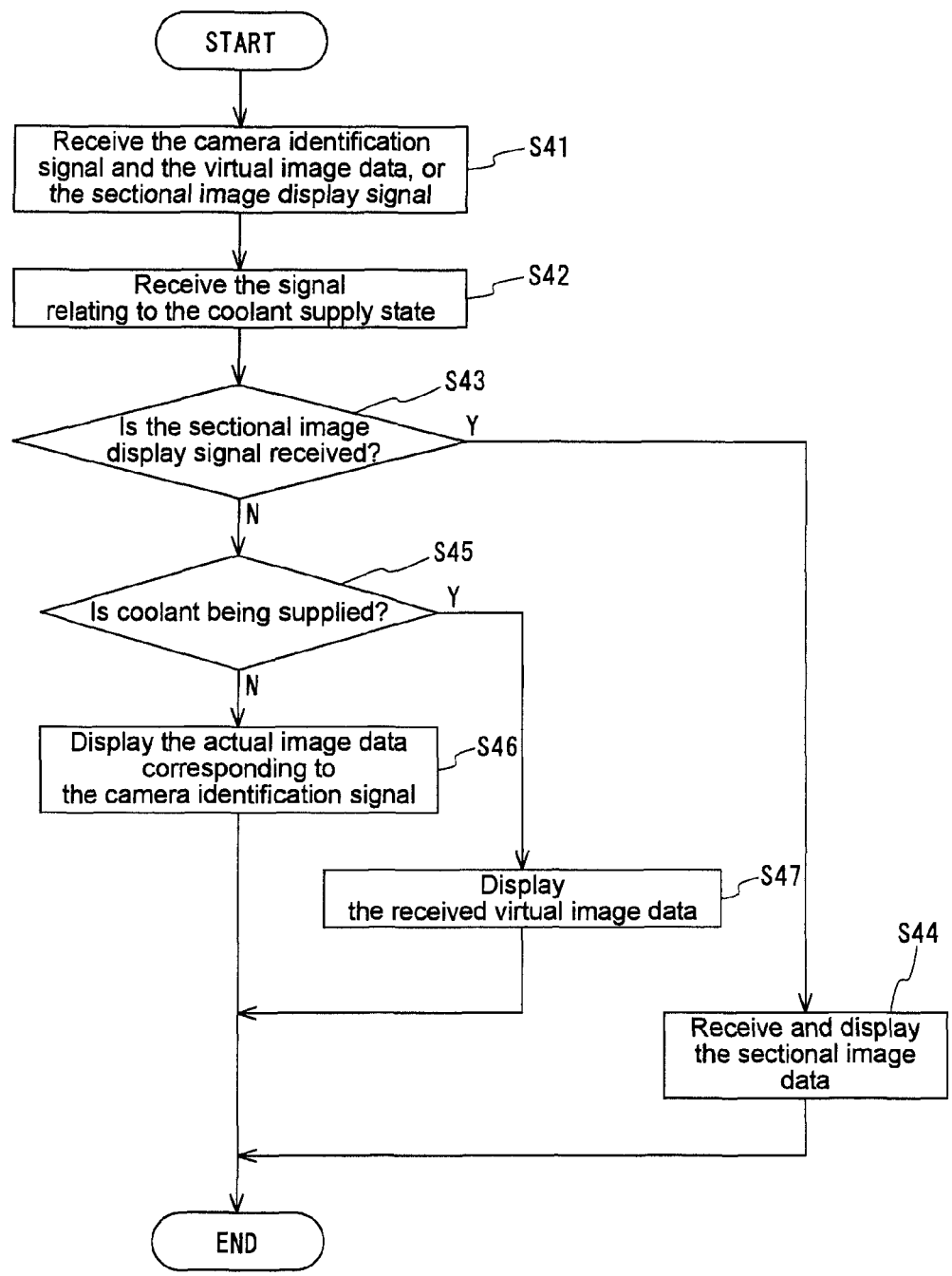
FIG. 9 is a flowchart showing a series of processes in a display-image switching section of the embodiment.

Specifically, the display-image switching section 25 is configured to carry out a series of processes as shown in FIG. 9. First, the display-image switching section 25 receives the camera identification signal and virtual image data which are transmitted from the camera selection section 24, or the sectional image display signal (step S41), and receives a signal relating to the coolant supply state transmitted from the control device 62 (step S42).

Next, the display-image switching section 25 checks whether the sectional image display signal is received (step S43). When determining that the signal is received, the display-image switching section 25 receives the sectional image data transmitted from the sectional image generating section 26, and displays the received sectional image data on the display device 65 (step S44). As an example of the sectional image displayed at this time, the images shown in FIG. 11 are provided.

On the other hand, in step S43, when determining that the sectional image display signal is not received, the display-image switching section 25 checks whether coolant is being supplied to the contact portion of the tool T and the workpiece W, based on the signal relating to the coolant supply state received in step S42 (step S45). When determining that coolant is not being supplied, the actual image data output from the actual CCD camera which is identified by the camera identification signal received in step S41 is displayed on the display device 65 (step S46). When determining that coolant is being supplied, the virtual image data received in step S41 is displayed on the display device 65 (step S47). As an example of the actual image displayed at this time, the image shown in FIG. 4(b) or 4(d) is provided. As an example of the virtual image, the image shown in FIG. 7(b) or 7(d) is provided.

When receiving the sectional image generation signal transmitted from the camera selection section 24, the sectional image generating section 26 generates virtual two-dimensional image data as sectional image data by a computer process, based on the parameters stored in the camera parameter storage section 15 and the model data updated by the model data updating section 17, the virtual two-dimensional image data including, for example, a part of the table 56, the tool T, a sectional shape appearing when at least the workpiece W is cut along a predetermined cutting plane, and the shape of the workpiece W which is located behind the predetermined cutting plane. And the generated sectional image data is transmitted to the display-image switching section 25. The way of generating such sectional image is not particularly limited. For example, a sectional image can be generated in the same way as the virtual image data in the virtual image generating section 18.

The predetermined cutting plane is set so as to pass through at least the distal end of the tool (the intersection of the distal end surface of the tool T and the axis of the tool T (spindle 55)). As an example of the sectional image generated when, for example, the cutting plane passes through the distal end of the tool T and is parallel to the X-axis and the Z-axis, the sectional image shown in FIG. 11(a) is provided. As an example of the sectional image generated when, for example, the cutting plane passes through the distal end of the tool T and is perpendicular to the optical axis of the first actual CCD camera 11, the sectional image shown in FIG. 11(*b*) is provided. Besides, the cutting plane may be a plane which passes through the distal end of the tool T and is perpendicular to the optical axis of the actual CCD camera 12, 13 or 14.

When the cutting plane is set so as to be perpendicular to the optical axis of any one of the actual CCD cameras 11, 12, 13 and 14, it is preferred that the cutting plane is perpendicular to the optical axis of the CCD camera corresponding to the image data which has been displayed just before sectional image data is displayed on the display device 65 (when switching from actual image data or virtual image data to sectional image data). When configured so that the camera selection section 24 transmits the camera identification signal to the sectional image generating section 26 and the sectional image generating section 26 identifies the selected actual CCD camera 11, 12, 13 or 14 based on the camera identification signal, it is possible to distinguish the optical axis of the CCD camera corresponding to the image data which has been displayed just before sectional image data is displayed.

According to the machining status monitoring apparatus 1 of the present embodiment thus configured, first, the camera parameters of the actual CCD cameras 11, 12, 13 and 14 are stored in the camera parameter storage section 15 and the model data of the entire machine tool 50 is stored in the model data storage section 16.

When the feed mechanisms 57, 58 and 59 are driven by the control device 62, the model data of the entire machine tool 50 in the model data storage section 16 is updated by the model data updating section 17 synchronically with the actual operations of the first saddle 52, second saddle 53 and spindle head 54, based on the operation command obtained from the control device 62. It is noted that, in the machine tool 50, coolant is supplied to the contact portion of the tool T and the workpiece W depending on the contents of the machining during machining of the workpiece W.

The tool T and the workpiece W are imaged by the actual CCD cameras 11, 12, 13 and 14 and actual image data thereof are generated. Simultaneously, by the virtual image generating section 18, virtual image data of the tool T, workpiece W and a part of the table 56 are generated correspondingly to each of the virtual CCD cameras 19, 20, 21 and 22, based on the parameters in the camera parameter storage section 15 and the model data updated by the model data updating section 17.

When virtual image data are generated, the camera selection section 24 selects one actual CCD camera and one virtual CCD camera which are each able to capture an actual image or a virtual image in which the distal end of the tool T is not hidden by the workpiece W, based on the generated virtual image data. Alternatively, the determination is made that the distal end of the tool T is hidden in all of the virtual images and a sectional image generation signal is generated.

When a sectional image generation signal is generated, the sectional image generating section 26 generates sectional image data including a part of the table 56, the tool T, a sectional shape appearing when at least the workpiece W is cut, and the shape of the workpiece W which is located behind the cutting plane, based on the parameters in the camera parameter storage section 15 and the model data updated by the model data updating section 17.

Under the control of the display-image switching section 25, the actual image data which is generated by the actual CCD camera selected by the camera selection section 24 is displayed when coolant is not being supplied, and the virtual image data which is generated by the virtual CCD camera selected by the camera selection section 24 is displayed when coolant is being supplied. When sectional image data is generated by the sectional image generating section 26, then such sectional image data is displayed.

Thus, according to the machining status monitoring apparatus 1 of the present embodiment, the operator can visually recognize the machining status of the workpiece W through virtual images when coolant is being supplied to the contact portion of the tool T and the workpiece W, and through actual images when coolant is not being supplied. Therefore, the operator can always monitor the machining status of the workpiece W regardless of whether coolant is being supplied.

Further, it is configured so that the virtual CCD camera which generated the virtual two-dimensional image data in which the distal end of the tool T is not hidden by the workpiece W is identified based on the virtual two-dimensional image data generated by imaging the tool T and the workpiece W from different view points by means of a plurality of the virtual CCD cameras 19, 20, 21 and 22 and the actual two-dimensional image data generated by the actual CCD camera corresponding to the identified virtual CCD camera is displayed on the display device 65. Therefore, an actual image in which the distal end of the tool T is not hidden by the workpiece W can be always displayed when displaying an actual image.

If it is configured so that all of the actual two-dimensional image data generated by the actual CCD cameras 11, 12, 13 and 14 are displayed on the display device 65, a heavy load is applied to the computer, which has a bad influence upon other processes. However, in the present embodiment, since it is configured so that only the actual two-dimensional image data generated by any one of the actual CCD cameras 11, 12, 13 and 14 is displayed, it is possible to reduce the load.

When the distal end of the tool T is hidden by the workpiece W in all of the virtual two-dimensional images, the sectional image data generated by the sectional image generating section 26 is displayed on the display device 65. Therefore, even if machining in which the distal end of the tool T is hidden by the workpiece W, such as hole machining or groove machining, is performed, the operator can monitor the machining status of the workpiece W through the displayed images.

Further, when setting a plane which passes through the distal end of the tool T and is perpendicular to the optical axis of any one of the actual CCD cameras 11, 12, 13 and 14 as a cutting plane for generating sectional image data, the sectional image when viewing the tool T and the workpiece W from the same direction as any one of the actual and virtual CCD cameras 11, 12, 13, 14, 19, 20, 21 and 22 can be displayed. Therefore, it is possible to prevent the operator from having the difficulty of recognizing the direction from which the tool T and the workpiece W are viewed because of the change of view direction.

Thus, one embodiment of the present invention has been described. However, specific modes in which the present invention is realized are not limited thereto.

For example, the cutting plane for cutting the workpiece W is not limited to the above-described cutting plane and it may be a plane which passes through the distal end of the tool T and is parallel to the Y-axis and the Z-axis, for example. Alternatively, when the tool T moves linearly, it is may be a plane which passes through the axis of the tool T and is parallel to the moving direction of the tool T. Further, when the tool T moves in a circle, it may be a plane which passes through the axis of the tool T and the center of the circle. It is noted that the moving direction of the tool T is recognized by the sectional image generating section 26 reading ahead the NC program, or recognized based on the predicted moving position of the tool T which is obtained from the control device 62, for example.

In the above embodiment, it is configured so that the camera selection section 24 distinguishes one virtual image in which the distal end of the tool T is not hidden in step S33. However, it can be configured so that all of the virtual images in which the tool T is not hidden are distinguished, or so that some of the virtual images in which the tool T is not hidden are distinguished. When thus configured, a plurality of the actual images or virtual images in which the distal end of the tool T is not hidden can be displayed on the display device 65.

Further, in the above embodiment, the actual CCD cameras 11, 12, 13 and 14 image the tool T and the workpiece W and the virtual image generating section 18 generates virtual image data of the tool T, workpiece W and a part of the table 56. However, since a jig is usually used when fixing the workpiece W on the table 56, it may be configured so that the actual CCD cameras 11, 12, 13 and 14 image the tool T, the workpiece W and the jig and the virtual image generating section 18 generates virtual image data of the tool T, workpiece W, a part of the table 56 and the jig. In this case, an actual image or virtual image in which the distal end of the tool T is hidden neither by the workpiece W nor by the jig is displayed.

Figure 12:
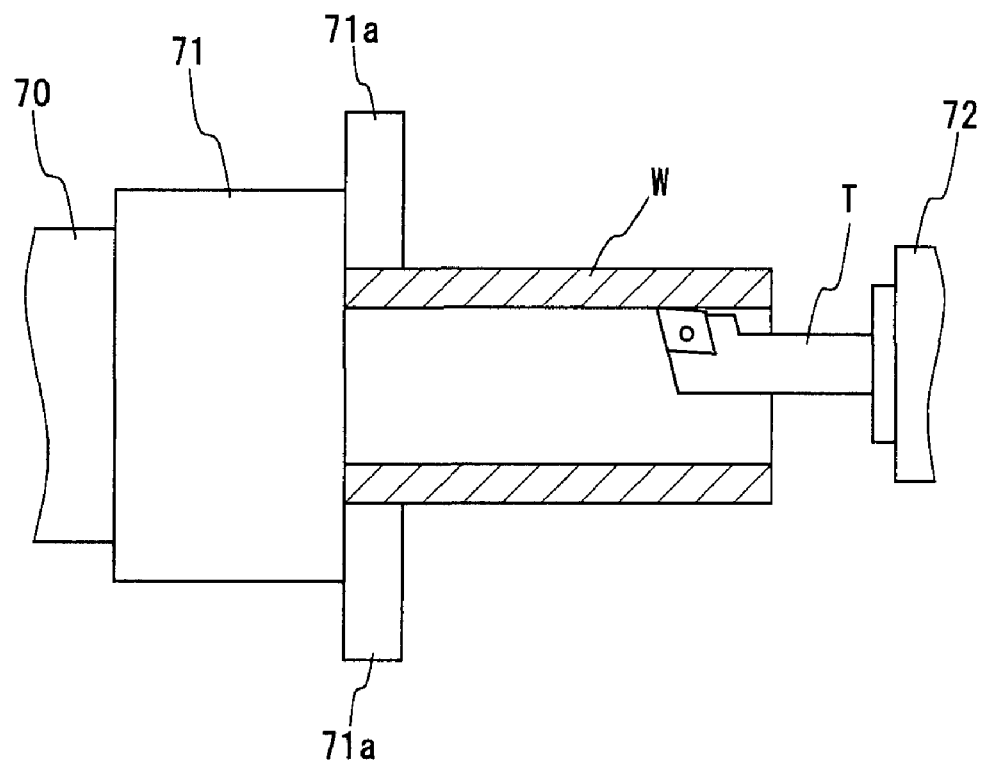
FIG. 12 is an illustration showing an example of a sectional image of another embodiment of the present invention.

Moreover, the machine tool 50 provided with the machining status monitoring apparatus 1 is not limited and any machine tool 50 is acceptable. For example, instead of the machining center in the above embodiment, the machining status monitoring apparatus 1 may be provided on a lathe or the like. In the case of a lathe, the cutting plane for generating sectional image data is preferably a plane passing through the distal end (edge portion) of the tool T and the axis of a spindle 70 (chuck 71) as shown in FIG. 12. In FIG. 12, the reference number 71 designates a chuck mounted to the distal end of the spindle 70 for holding the workpiece W; the reference number 71*a* designates a gripping jaw of the chuck 71; and the reference number 72 designates a tool rest for holding the tool T.

REFERENCE SIGNS LIST

1 machining status monitoring apparatus
11, 12, 13, 14 actual CCD camera
15 camera parameter storage section
16 model data storage section
17 model data updating section
18 virtual image generating section
19, 20, 21, 22 virtual CCD camera
23 display control section
24 camera selection section
25 display-image switching section
26 sectional image generating section
50 machining tool
55 spindle
56 table
61 coolant supply device
W workpiece
T tool
Citation List
Patent Literature
Japanese Unexamined Patent Application Publication No. 2005-190102

The invention claimed is:

1. A machining status monitoring method in a machine tool, comprising:
a tool holding means for holding a tool,
workpiece holding means for holding a workpiece,
drive means for operating one or both of said holding means for a tool or workpiece,
supply means for supplying coolant to a contact portion of the tool and the workpiece,
control means for controlling the operation of the supply means, and controlling the operation of the drive means based on an operation command relating to one or both of the holding means, and
display means for displaying image data,
wherein the machining status monitoring method comprises:
an actual image generating step of imaging the tool and the workpiece at a certain time interval by means of at least one imaging means from a predetermined view point, and in turn generating actual two-dimensional image data thereof;
a model updating step in which, based on the operation command and data on three-dimensional models of the holding means, tool and workpiece, model data of the holding means, tool and workpiece when one or both of the holding means are operated according to the operation command are generated and the model data thereof are updated;
a virtual image generating step of generating virtual two-dimensional image data of the tool and workpiece based on the model data updated in the model updating step, the virtual image data generating step in which a three-dimensional space is virtually set;
wherein in the virtual three-dimensional space, the three-dimensional models of the tool and workpiece are arranged and imaging means having the same condition as that of the actual imaging means is virtually set and arranged; and
virtual two-dimensional image data which are assumed to be obtained when the tool and the workpiece are imaged at a certain time interval by the virtual imaging means from the same view point as that of the actual imaging means are generated in turn; and
an image display step of checking whether coolant is being supplied to the contact portion of the tool and the workpiece based on information relating to the coolant supply state, and displaying on the display means actual two-dimensional image data generated by the actual imaging means when coolant is not being supplied, and displaying on the display means virtual two-dimensional image data generated in the virtual image generating step when coolant is being supplied.

2. A machining status monitoring apparatus provided on a machine tool comprising:
a tool holding means for holding a tool,
workpiece holding means for holding a workpiece,
drive means for operating one or both of the holding means,
supply means for supplying coolant to a contact portion of the tool and the workpiece,
control means for controlling an operation of the supply means, and controlling an operation of the drive means based on an operation command relating to one or both of the holding means, and display means for displaying image data,
the machining status monitoring apparatus comprising:
at least one actual imaging means for imaging the tool and the workpiece at a certain time interval from a predetermined view point, and in turn generating actual two-dimensional image data thereof; model data updating means for, after receiving the operation command from the control means, based on the received operation command and data on three-dimensional models of the holding means, tool and workpiece, generating model data of the holding means, tool and workpiece which are in a state in which one or both of the holding means are operated according to the operation command, and updating the model data thereof;

virtual image generating means for generating virtual two-dimensional image data of the tool and workpiece based on the model data updated by the model data updating means, the virtual image generating means in which a three-dimensional space is virtually set;

in the virtual three-dimensional space, the three-dimensional models of the tool and workpiece are arranged and imaging means having the same condition as that of the actual imaging means is virtually set and arranged;

virtual two-dimensional image data which are assumed to be obtained when the tool and the workpiece are imaged at a certain time interval by the virtual imaging means from the same view point as that of the actual imaging means, are generated in turn; and display control means for, after receiving from the control means information relating to the state of the supply of coolant by the supply means, checking whether coolant is being supplied to the contact portion of the tool and the workpiece based on the received information, and displaying on the display means actual two-dimensional image data generated by the actual imaging means when coolant is not being supplied, and displaying on the display means virtual two-dimensional image data generated by the virtual image generating means when coolant is being supplied.

3. The machining status monitoring apparatus according to claim 2, wherein the machining status monitoring apparatus has sectional image generating means for generating sectional image data including the tool and a sectional shape appearing when at least the workpiece is cut along a plane passing through the distal end of the tool based on the model data updated by the model data updating means, the virtual image generating means is configured so that virtual imaging means having the same conditions as those of a plurality of the actual imaging means which image the tool and the workpiece from different view points are set as many as the actual imaging means, virtual two-dimensional image data which are assumed to be obtained when the tool and the workpiece represented by three-dimensional model are imaged at a certain time interval by the virtual imaging means from the same view points as those of the actual imaging means are generated in turn, and the display control means is configured to, based on virtual two-dimensional image data generated by the virtual image generating means, check whether the distal end of the tool is hidden by the workpiece in all of the virtual two-dimensional images, and display on the display means sectional image data generated by the sectional image generating means when determining that the distal end of the tool is hidden in all of the virtual two-dimensional images.

4. The machining status monitoring apparatus according to claim 3, wherein the sectional image generating means is configured to set a plane which passes through the distal end of the tool and is perpendicular to the optical axis of any one of the actual imaging means as a cutting plane in generating the sectional image data.

5. The machining status monitoring apparatus according to claim 3, wherein in a case where the machine tool is a lathe and the workpiece holding means is a spindle, the sectional image generating means is configured to set a plane passing through the distal end of the tool and the axis of the spindle as a cutting plane in generating the sectional image data.

6. A machining status monitoring method in a machine tool comprising:

a tool holder for holding a tool, a workpiece holder for holding a workpiece, a driver for operating one or both of the holders, a supplier for supplying coolant to a contact portion of the tool and the workpiece, a controller for controlling the operation of the supplier, and controlling the operation of the driver based on an operation command relating to one or both of the holder, and a display for displaying image data, the machining status monitoring method comprising:

an actual image generating step of imaging the tool and the workpiece at a certain time interval by at least one imager from a predetermined view point, and in turn generating actual two-dimensional image data thereof;

a model updating step in which, based on the operation command and data on three-dimensional models of the holder, tool and workpiece, model data of the holder, tool and workpiece when one or both of the holders are operated according to the operation command are generated and the model data thereof are updated;

a virtual image generating step of generating virtual two-dimensional image data of the tool and workpiece based on the model data updated in the model updating step, the virtual image data generating step in which a three-dimensional space is virtually set; wherein this virtual three-dimensional space, the three-dimensional models of the tool and workpiece are arranged and a virtual imager has the same condition as that of the actual imager is virtually set and arranged; and virtual two-dimensional image data which are assumed to be obtained when the tool and the workpiece are imaged at a certain time interval by the virtual imager from the same view point as that of the actual imager are generated in turn; and an image display step of checking whether coolant is being supplied to the contact portion of the tool and the workpiece based on information relating to the coolant supply state, and displaying on the display actual two-dimensional image data generated by the actual imager when coolant is not being supplied, and displaying on the display virtual two-dimensional image data generated in the virtual image generating step when coolant is being supplied.

7. A machining status monitoring apparatus provided on a machine tool comprising:

a tool a tool holder for holding a tool, a workpiece holder for holding a workpiece, a driver for operating one or both of the holders, a supplier for supplying coolant to a contact portion of the tool and the workpiece, a controller for controlling an operation of the supplier, and controlling an operation of the driver based on an operation command relating to one or both of the holders, and a display for displaying image data, the machining status monitoring apparatus comprising:

at least one actual imager for imaging the tool and the workpiece at a certain time interval from a predetermined view point, and in turn generating actual two-dimensional image data thereof;

a model data updater for, after receiving the operation command from the controller, based on the received operation command and data on three-dimensional models of the holder, tool and workpiece, generating model data of the holder, tool and workpiece which are in a state in which one or both of the holders are operated according to the operation command, and updating the model data thereof;

a virtual image generator for generating virtual two-dimensional image data of the tool and workpiece based on the model data updated by the model data updater, the virtual image generator in which a three-dimensional space is virtually set; wherein in this virtual three-dimensional space, the three-dimensional models of the tool and workpiece are arranged and a virtual imager having the same condition as that of the actual imager is virtually set and arranged; and virtual two-dimensional image data which are assumed to be obtained when the tool and the workpiece are imaged at a certain time interval by the virtual imager from the same view point as that of the actual imager, are generated in turn; and a display controller for, after receiving from the controller information relating to the state of the supply of coolant by the supplier, checking whether coolant is being supplied to the contact portion of the tool and the workpiece based on the received information, and displaying on the display actual two-dimensional image data generated by the actual imager when coolant is not being supplied, and displaying on the display virtual two-dimensional image data generated by the virtual image generator when coolant is being supplied.

8. The machining status monitoring apparatus according to claim 7, wherein the machining status monitoring apparatus has sectional image generator for generating sectional image data including the tool and a sectional shape appearing when at least the workpiece is cut along a plane passing through the distal end of the tool based on the model data updated by the model data updater, the virtual image generator is configured so that the virtual imager has the same conditions as those of a plurality of the actual imager which image the tool and the workpiece from different view points are set as many as the actual imager, and virtual two-dimensional image data which are assumed to be obtained when the tool and the workpiece represented by three-dimensional model are imaged at a certain time interval by the virtual imager from the same view points as those of the actual imager are generated in turn, and the display controller is configured to, based on virtual two-dimensional image data generated by the virtual image generator, check whether the distal end of the tool is hidden by the workpiece in all of the virtual two-dimensional images, and display on the display sectional image data generated by the sectional image generator when determining that the distal end of the tool is hidden in all of the virtual two-dimensional images.

9. The machining status monitoring apparatus according to claim 8, wherein the sectional image generator is configured to set a plane which passes through the distal end of the tool and is perpendicular to the optical axis of any one of the actual imager as a cutting plane in generating the sectional image data.

10. The machining status monitoring apparatus according to claim 8, wherein in a case where the machine tool is a lathe and the workpiece holder is a spindle, the sectional image generator is configured to set a plane passing through the distal end of the tool and the axis of the spindle as a cutting plane in generating the sectional image data.

* * * * *